United States Patent [19]

Fukuhara et al.

[11] Patent Number: 5,140,460
[45] Date of Patent: Aug. 18, 1992

[54] MOTION-PICTURE SCREEN

[75] Inventors: Suemei Fukuhara; Satoshi Kageyama, both of Osaka, Japan

[73] Assignee: Matsushita Electric Industrial Co., Ltd., Osaka, Japan

[21] Appl. No.: 788,019

[22] Filed: Nov. 5, 1991

[30] Foreign Application Priority Data

| Nov. 7, 1990 [JP] | Japan | 2-303588 |
| Nov. 14, 1990 [JP] | Japan | 2-309821 |
| Mar. 28, 1991 [JP] | Japan | 3-64384 |

[51] Int. Cl.$^5$ .............................. G03B 21/56
[52] U.S. Cl. ............................................ 359/445
[58] Field of Search .......................... 359/444, 445

[56] References Cited

U.S. PATENT DOCUMENTS

| 1,743,602 | 1/1930 | Harson | 359/445 |
| 1,785,330 | 12/1930 | Schoonmaker | 359/445 |
| 1,808,077 | 6/1931 | Schoonmaker | 359/445 |
| 1,808,078 | 6/1931 | Schoonmaker | 359/445 |
| 1,877,941 | 9/1932 | Morris | 359/444 |
| 1,982,600 | 11/1934 | Sponable | 359/444 |
| 1,985,460 | 12/1934 | Raven | 359/445 |
| 2,130,704 | 9/1938 | Patzwaldt | 359/445 |
| 2,238,365 | 4/1941 | Hurley | 359/445 |
| 3,692,384 | 9/1972 | Kimura et al. | 359/445 |

FOREIGN PATENT DOCUMENTS 61-98336  5/1986  Japan.

OTHER PUBLICATIONS

"About Theater THX System and Home THX System", by Tomlinson Holman; JAS Journal Nov. 1989.
"Sound Transmission Through Perforated Screens" by Michael Rettinger; SMPTE Journal, Dec. 1982.

*Primary Examiner*—Richard A. Wintercorn
*Attorney, Agent, or Firm*—Lowe, Price, LeBlanc & Becker

[57] ABSTRACT

A motion-picture screen for projecting an optical image, which comprises a weaved knit having an adequate air permeability. One surface of the weaved knit is coated with a colored material so as to keep a high acoustic permeability concurrently with shutting the light from a wall or the like existing at the rear side of the screen. The other surface of the weaved knit is used as a surface onto which the optical image is projected by a projector, thereby providing an excellent contrast and a high image quality on the screen.

8 Claims, 6 Drawing Sheets

TWISTED FIBER

BAR-LIKE FIBER

MOTION-PICTURE SCREEN

BACKGROUND OF THE INVENTION

The present invention relates to a motion-picture screen for projection of an optical image.

Recently, in accordance with the improvement of the video image technique, the picture (film) for family tends to be shown with a large-sized screen. This tendency requires that the audio system is arranged to provide a sound having an excellent tone quality and a powerful reproduction suitable for the large-sized screen. FIG. 1 is an illustration of an example of AV systems which, in addition to a projector 5 and a screen 10, comprises a central loud speaker 3 principally corresponding to a speech channel, left and right loud speaker 2 and 4 corresponding to background-music-channels, and several surround loud speakers placed at the rear side or the left and right sides of the screen 10. Here, as illustrated in FIG. 2, the screen 10 is constructed with a vinyl chloride sheet 1'a, a white coating 1'b applied on a surface of the vinyl chloride sheet 1'a and a reflection material such as glass beads 1'c, and the screen 10 itself does not have an acoustic permeability.

As disclosed in "About Theater THX system and Home THX system", JAS Journal November 1989, written by Tomlinson Holman, for the picture sound reproduction in a theater, the front-channel loud speaker is disposed at the rear side of the acoustic-permeability type screen so that the image is substantially coincident in position with the picture. On the other hand, since the conventional home-use screen does not have the acoustic permeability as described above, there is a problem which arises with the FIG. 1 AV system, however, in that difficulty is encountered to dispose the central-channel loud speaker 3 at the rear side of the screen 10 as well as in the theater. Accordingly, the central-channel loud speaker 3 is required to be placed at a position which does not cause blocking the projection light from the projector 5 disposed at the front side of the screen 10. This limitation of the placing position can result in the lack of powerful reproduction because the screen position and the sound position are different from each other.

Even if as illustrated in FIG. 3 sound holes 1"a are formed in a screen 1" at a predetermined rate in a screen 1", the air permeability to be obtained is generally about 40 (Frazier type measuring apparatus for air permeability, $cm^3/cm^2 \cdot sec$) only. As obvious from FIG. 4, the sound-pressure transmission characteristic in the case that the air permeability is 40 is clearly lower than the sound-pressure transmission characteristic in the case that it is 100. In the case that the air permeability is 100, the sound pressure attenuation is approximately 1 to 2 dB in the band of above 1 kHz and this scarcely provide a problem in practice. On the other hand, in the case that the air permeability is 40, the sound pressure is attenuated such that large peak dips successively occur from the vicinity of 1 kHz. The average sound pressure attenuation is approximately 6 dB and the maximum sound pressure attenuation is above 10 dB. This fact is disclosed in "Sound Transmission Through Perforated Screens" SMPTE Journal, December 1982, written by Michael Rettinger. In this case, difficulty is encountered to perform the characteristic correction by means of electrical circuits or the like.

One possible solution for improving the acoustic transmission characteristic is that the size of the sound-transmission holes is increased and the number of the sound-transmission holes is increased. In this case, there is no problem in the case of being used in the theater, that is, in the case that the screen is placed at a position away from the audience, while in the case of the home-use screen, that is, in the case that the screen is placed at a position relatively close to the audience, the sound-transmission holes can offer a visual problem because of being clearly visible as black spots. One known approach for eliminating such a problem involves using a screen constructed with a weaved knit screen having a predetermined air permeability as disclosed in Japanese Patent Provisional Publication No. 61-98336. Although eliminating the problem due to the sound-transmission holes, this provides a new problem that light penetrates the screen. That is, as illustrated in FIG. 5, a projection light 9 penetrates a screen 1 before being reflected on a wall 7 or the like presented at the rear side of the screen 1. The reflection light 9a illuminates the back of the screen 1 and returns to the projector side. This cause deterioration of the contrast of the image. In FIG. 5, numeral 8 represents a sound wave from the loud speaker 2. In addition, the aforementioned publication also discloses a technique in which a screen is made by performing the aluminium vacuum deposition with respect to a surface of a cloth. However, according to an test, there is a problem which arises with such a technique, however, in that the screen gain is considerably lowered to darken the image. Moreover, the image quality is extremely deteriorated because of the irregularity which appears on the surface of the screen due to the texture of the cloth.

SUMMARY OF THE INVENTION

It is therefore an object of the present invention to provide a screen having a high acoustic permeability and a high visual performance.

According to a present invention there is provided a motion-picture screen comprising a weaved knit which has a predetermined air permeability and whose color is substantially white. A dark-colored thin film is formed on one surface of the weaved knit and the other surface of the weaved knit is used as a surface onto which an optical image is projected by a projector. The weaved knit itself can offer an adequate air permeability to ensure an excellent acoustic permeability, and the dark-colored thin film formed on the one surface of the weaved knit can shut light from a wall or the like existing at the rear side of the screen to obtain an excellent contrast. Further, since the surface of the weaved knit itself whose color is substantially white is used as the projection surface of the screen, it is possible to provide a high image quality with less deterioration of the screen gain.

Also, according to this invention there is provided a screen where a metallic thin film is formed on one surface of a weaved knit and the other surface of is weaved knit is used as a surface onto which an optical image is projected by a projector. The formation of the metallic thin film is made by means of the sputtering technique to thereby heighten the adhesion between the formed thin film and the weaved knit to keep a high reliability for a long time.

In this invention, the predetermined air permeability is set to be substantially above 100 $cm^3/cm^2 \cdot sec$ (when measured by Frazier type measuring apparatus for air permeability).

Further, in accordance with the present invention, there is provided a screen for projecting an optical image, comprising a first weaved knit which has a first predetermined air permeability and whose color is substantially white and a second weaved knit which has a second predetermined air permeability and whose color is substantially black, one surface of the first weaved knits and one surface of the second weaved knit being overlapped one upon another so that the other surface of the first weaved knit is used as a surface onto which said image is projected. Still further, there is provided a screen for projecting an optical image, comprising first and second weaved knits which have first and second predetermined air permeabilities and whose colors are substantially white, a metallic coat which has a dark color being formed on one surface of the second weaved knit, and the first and second weaved knits being overlapped one upon another so that the metallic-coat-formed surface of the second weaved knit is disposed to be in opposed relation to one surface of the first weaved knit and the other surface of the first or second weaved knit is used as a surface onto which the image is projected.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
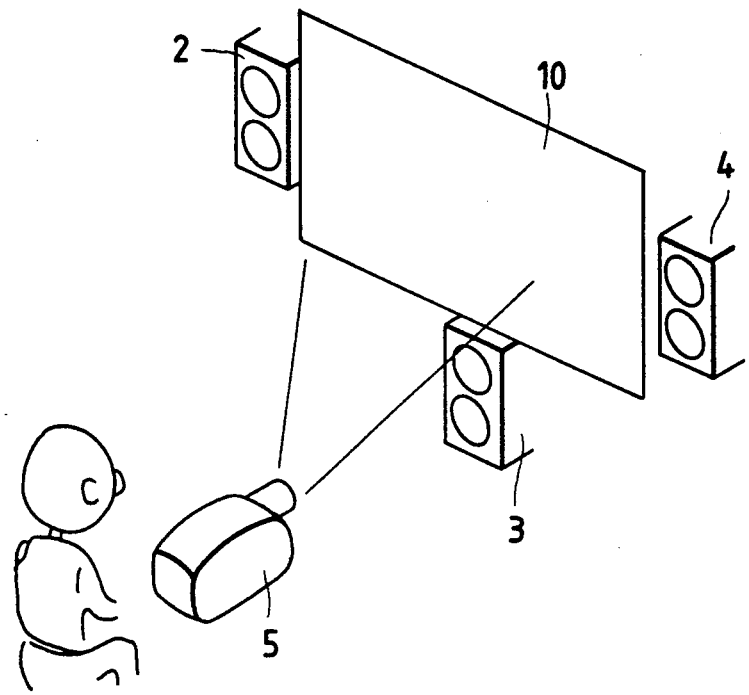
FIG. 1 schematically shows an arrangement of an AV system using a conventional sound non-transmitting screen.
Figure 2:
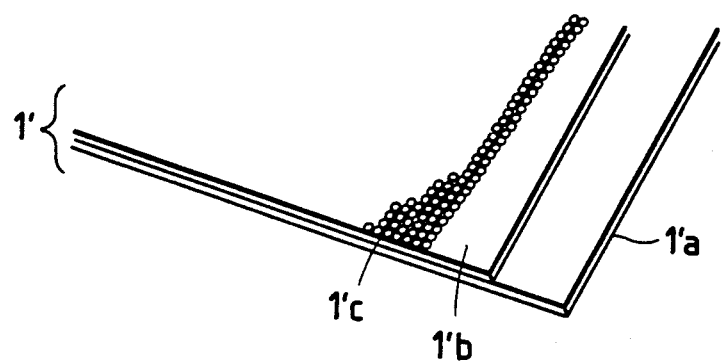
FIG. 2 is a partially cross-sectional view showing a structure of a conventional screen.
Figure 3:
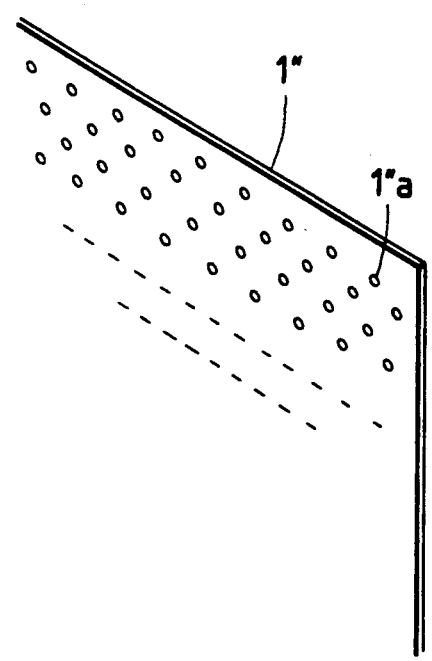
FIG. 3 is a perspective view showing a conventional screen having sound holes.
Figure 4:
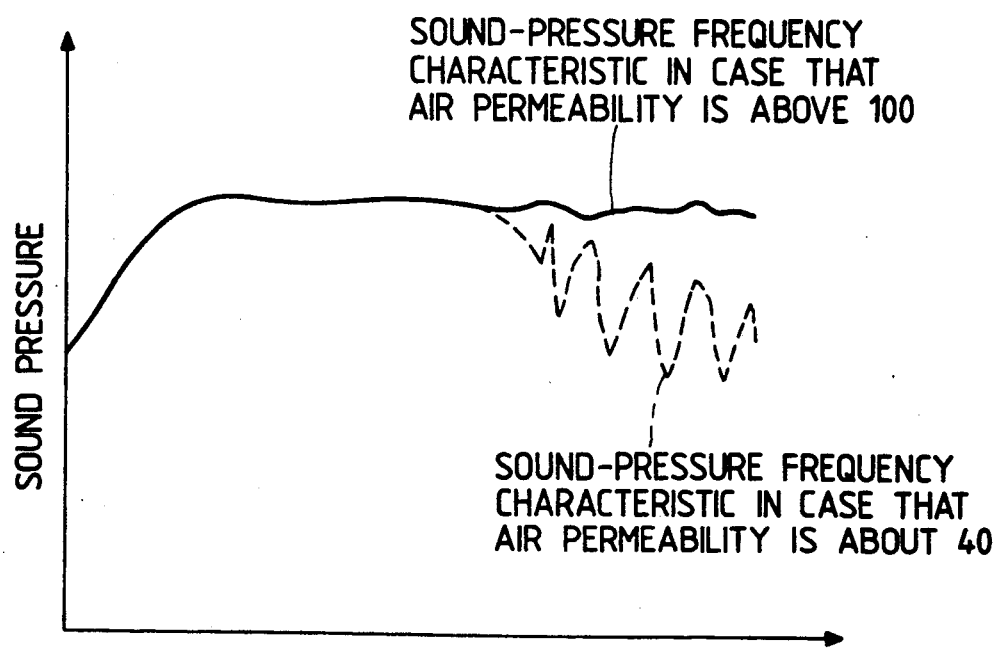
FIG. 4 is an illustration of the general relation between the air permeability and the acoustic permeability, i.e., the sound-pressure transmission characteristic.
Figure 5:
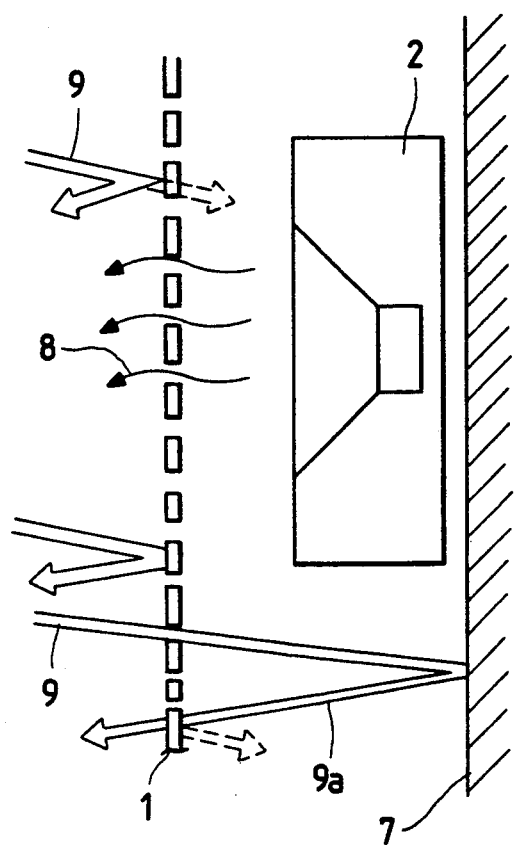
FIG. 5 partially illustrates an AV system using a general knit as the screen.
Figure 6:
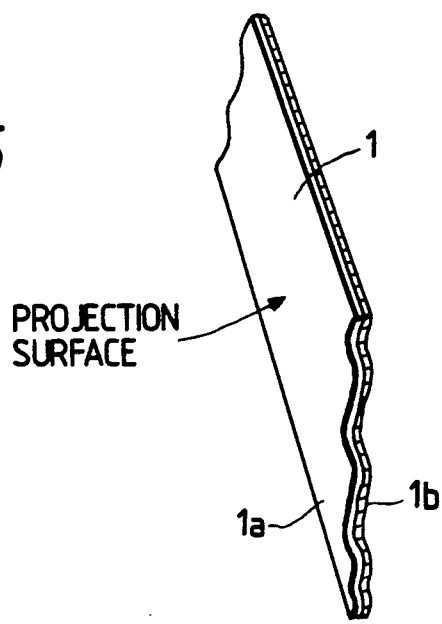
FIG. 6 is an illustration of arrangements of screens according to first and second embodiments of the present invention.
Figure 7:
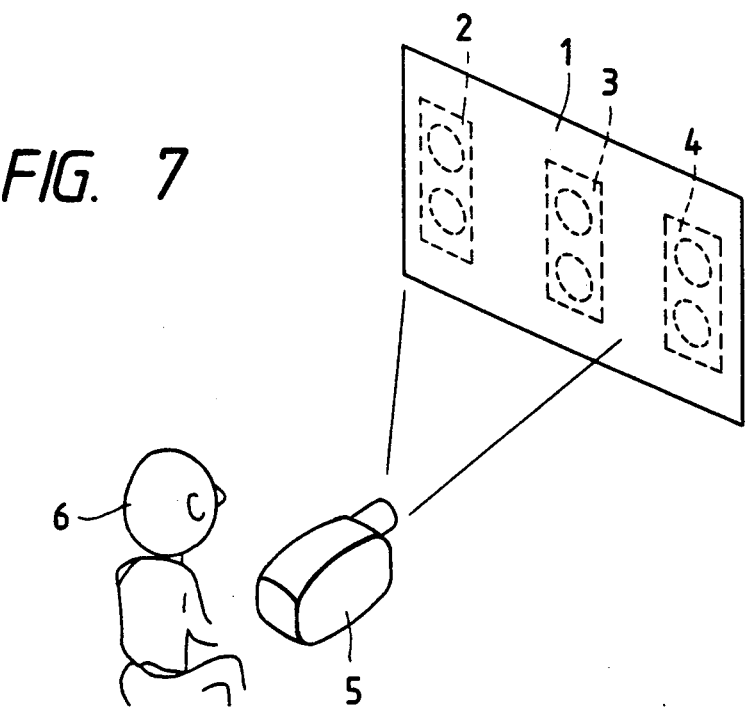
FIG. 7 is a schematic illustration of an AV system equipped with a screen according to the present invention.
Figure 8:
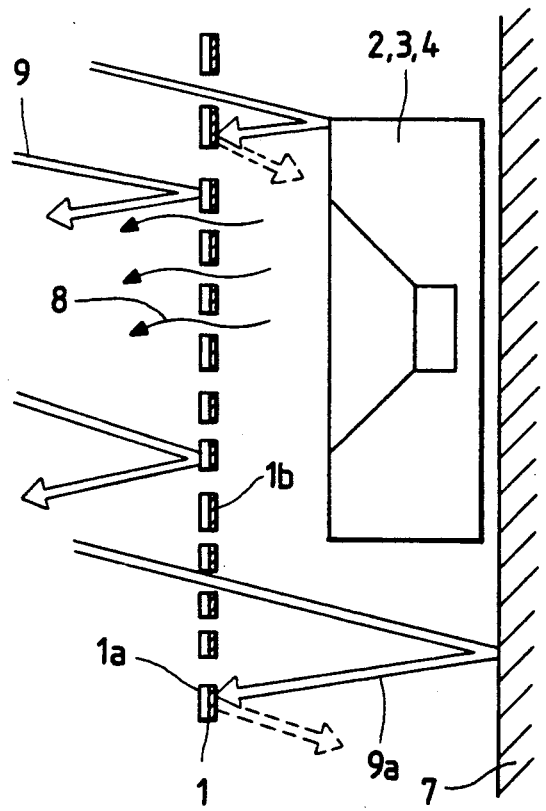
FIG. 8 is an illustration for describing the functions of the first and second embodiments of this invention.

Referring now to FIG. 6, there is illustrated a screen according to a first embodiment of the present invention. In FIG. 6, the screen designated at numeral 1 comprises a weaved knit formed by knitting threads whose color is substantially white, the the surface 1a is a projection surface. The surface 1b (opposite surface of 1a) is constructed by forming a colored (deep color) thin film, the surface 1b being arranged so as not to spoil the air permeability of the screen 1. Here, let it be assumed that the screen 1 thus arranged is used in an AV system as illustrated in FIG. 7 where numeral 2 represents a left-side loud speaker, 3 depicts a central loud speaker, 4 designates a right-side loud speaker and 5 denotes a projector. The loud speakers 2 to 4 are placed at the rear side of the screen 1. In FIG. 8, the sound wave 8 generated from the loud speaker 2, 3 or 4 placed at the rear side of the screen 1 can easily pass through the screen without a great deterioration so as to reach the audience 6. At this time, the audience 6 can be exposed to a powerful sound as well as in the theater sound reproduction system because the image position is substantially coincident with the sound position. On the other hand, the light 9 projected from the projector 5 to the screen 1 is reflected on the surface 1a constructed with the substantial white-color threads. A portion of the projected light 9 passes through the screen 1 to reach a wall 7 or the like which exists at the rear side of the screen 1 so as to be reflected thereon. The reflected light directs to the colored thin film (coated surface) 1b side of the screen 1. Here, the reflected light from the wall 7 is absorbed and reflected by the colored thin film 1b so as to prevent it from reaching the audience 6, whereby it is possible to improve the contrast as compared with the conventional screen. In addition, since the surface 1a to be projected with the light 9 is kept substantially white color, the screen gain is scarcely lowered so as to provide an excellent image quality. In cases where the air permeability of the screen 1 is arranged to be substantially above 100, as obvious from FIG. 9, particularly the acoustic permeability is increased.

Here, a description will be made with reference to the following table 1 in terms of the knit cloth with substantial white color which constitutes the screen 1.

TABLE 1

| Sample No. | Weight of Thread (g/1000 m) | Number of fibers of Thread | Number of Gages | Air Permeability | Screen Gain |
|---|---|---|---|---|---|
| 1 | 150 | 48 | 18 | 85 | 0.8 |
| 2 | 150 | 48 | 18 | 155 | 0.7 |
| 3 | 150 | 48 | 28 | 40 | 1 |
| 4 | 150 | 48 | 28 | 140 | 1.4 |

In the table 1, the screen gain is the relative values under the condition that the screen gain of the sample 3 is 1, and the samples 1 to 4 are different in knitted state from each other. The air permeability which is in the correlation to the acoustic permeability cannot be determined only by the size of the thread used and the number of gages but changed in accordance with the knitted states. Thus, for selection of the cloth of the screen, it is first required to select a cloth having a high air permeability.

The number of gages is a value indicating the number of stitches per 1-inch width, and when the number of gages is small, the number of stitches becomes small so that the area of the screen for reflecting the projection light is reduced to lower the screen gain. This is obvious from the fact that in the table 1 the screen gain (1.0) of the sample 3 whose gage number is 28 is higher than the screen gains (0.8, 0.7) of the samples 1 and 2 whose gage number is 18. Further, in the case that the number of gages is small, the concave portions on the surface of the cloth are easily visible as holes, whereby the reproducibility of the outline of the image can be deteriorated. Also in view of the fact that the surface onto which the image is projected is preferable to be flat, the samples 3 and 4 are more preferable in image quality as compared with the samples 1 and 2. Accordingly, the cloth with a larger number of gages is more preferable for constructing the screen.

Figure 10:
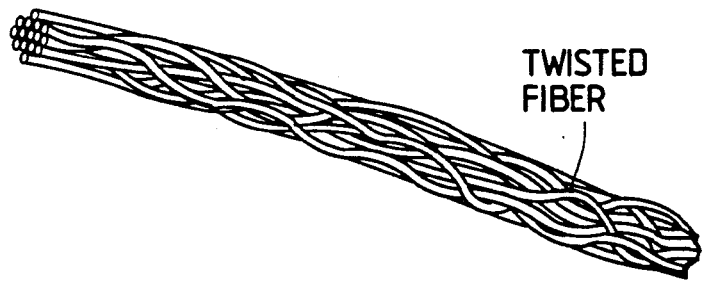
FIGS. 10 and 11 are illustrations of fibers constituting threads of a screen.
Figure 11:
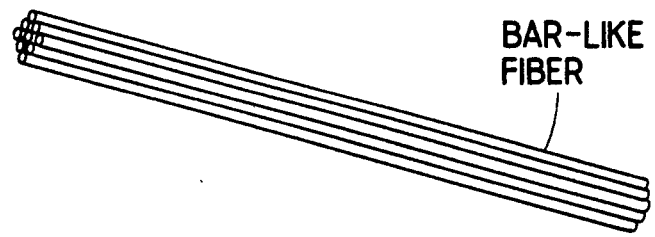

Further, a description will be made hereinbelow in terms of the fiber constituting the thread. In the table 1, the color of the cloth indicated as the sample 3 is substantially milky and the gloss hardly appear on the surface of the cloth. The fibers constituting each of the threads of the cloth are twisted as illustrated in FIG. 10 so that small irregularities are formed on the surface of the cloth. Accordingly, the light incident on the cloth is diffused by the small irregularities so as to reduce the reflection light toward the audience. On the other hand, the surface of the cloth indicated as the sample 4 has the gloss and is substantially white. The fibers constituting each of the threads of the cloth have substantial bar-like configurations (not twisted) as shown in FIG. 11 so that the small irregularities are are more reduced as compared with the sample 3. Thus, the diffusion of the incident light is suppressed whereby the reflection light to the audience is more increased as compared with the sample 3. This fact is also obvious by the comparison between the screen gains of both the samples 3 and 4 in the table 1, that is, the screen gain of the sample 4 is higher than that of the same 3. Accordingly, it is preferable that the fiber making up the threads of the cloth has a bar-like configuration.

Further, a second embodiment of the present invention will be described hereinbelow. One difference between the first embodiment and the second embodiment is that a metallic thin film is used instead of the above-described dark-colored thin film constituting the screen 1. The second embodiment can also provide an effect to improve the image contrast and the acoustic permeability as well as the first embodiment. The description of the second embodiment will be made with reference to the following table 2 in view of the fact that the screen contrast and screen gain varies in accordance with the thickness of the thin film to be formed on the back of the cloth. Here, the formation of the the metallic thin film is made by means of the stainless sputtering technique.

TABLE 2

| Set Thickness of Thin Film (angstrom) | Contrast | Screen Gain |
| --- | --- | --- |
| 200 | 0.7 | 1.3 |
| 300 | 1 | 1.2 |
| 400 | 1.1 | 1.0 |

In the table 2, the set thickness of the thin fimm shows a set value of a thin-film forming apparatus (a sputtering apparatus), the contrast represents the relative values when the contrast corresponding to the thin-film set thickness is 300, and the screen gain designates the relative values under the condition that the screen gain of the sample 3 in the table 1 is 1.

Unlike the case that the sputtering is effected with respect to a smooth surface such as a resin surface, the thickness of the metallic thin film formed on a surface of a knit in accordance with the sputtering technique is not constant. If the set value of the thickness of the thin film is low, the thin film is partially formed only on the convex portions of the knit surface with a large irregularity and most of the knit surface remains as it is without being coated with the thin film. If this knit is used as the screen 1 in FIG. 8, a portion of the light 9a reflected on the wall 7 after passed through the screen 1 is cut by the thin film 1b so as not to be directed to the audience, while most of the reflection light 9a is directed thereto because of passing through the surface on which the thin film is not formed. As a result, the contrast of the image to be formed on the screen 1 is deteriorated. This is also obvious from the table 2 where the contrast ratio becomes more increased as the set thickness of the thin film becomes more thickened. On the other hand, if the set value of the thickness of the thin film is high, the thin film is formed not only in the gaps between the threads but also in the gaps between the fibers of the threads so that the color (dark color) of the thin film itself is developed on the image-projected surface of the screen 1, thereby lowering the screen gain. Accordingly, the thickness of the thin film is required to be adequately determined in consideration of the screen gain, contrast ratio and others. The table 2 shows the thin film thickness, screen gain and contrast in the case that the sample 4 in the table 1 is used as the screen and these values vary in accordance with the cloth used as the screen.

According to the second embodiment, if the number of gages is set to be large and the fiber constituting the thread is arranged to have a substantial bar-like configuration, it is possible to provide a screen having a high acoustic permeability and allowing a high image quality as well as the above-described first embodiment. In addition, since the metallic thin film is formed in accordance with the sputtering deposition technique, the adhesion between the knit and the thin film is high, and if a rust-proof metal such as a stainless is used as the material of the thin film, the reliability of the screen can be kept for a long time irrespective of cleaning.

Figure 9:
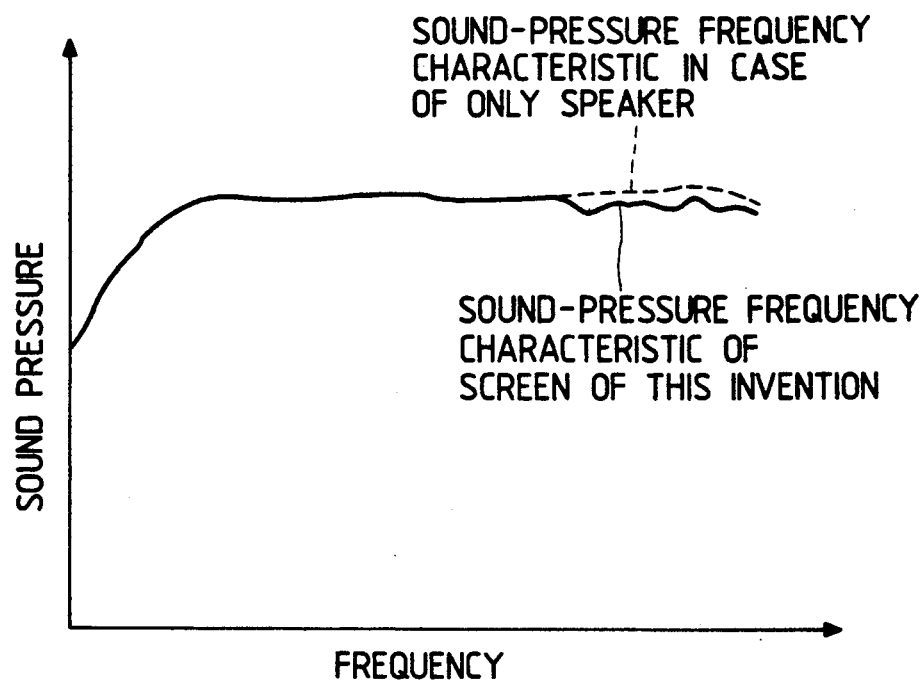
FIG. 9 is a graphic illustration for describing the sound transmission characteristic to be obtained by this invention.
Figure 12:
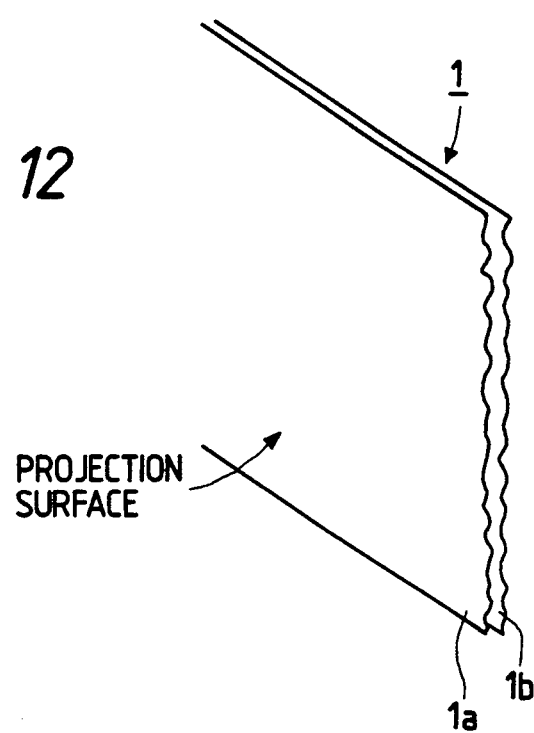
FIG. 12 is a perspective and cross-sectional view showing an arrangement of a screen according to a third embodiment of the present invention.
Figure 13:
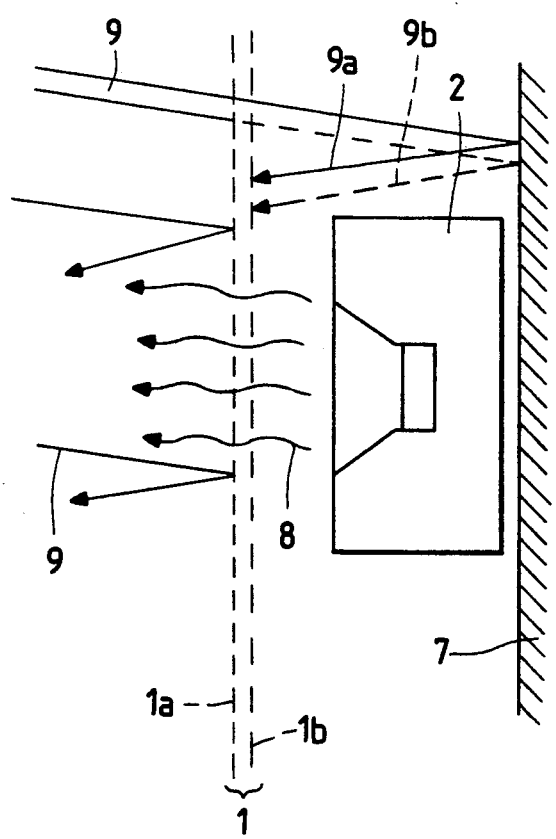
FIG. 13 is a schematic illustration for describing the function of the third embodiment of this invention.

Further, a third embodiment of this invention will be described hereinbelow with reference to FIG. 12. In FIG. 12, designated at numeral 1 is a screen according to the third embodiment constructed with a cloth which comprises a weaved knit 1a formed by knitting threads whose color is substantially white and a weaved knit 1b whose color is substantially black. The description will be made with reference to FIG. 13 in terms of the case that the screen 1 thus constructed is used in the AV system as illustrated in FIG. 7. In FIG. 13, the sound wave 8 from the loud speaker 2 (3, 4) placed at the rear side of the screen 1 passes through the screen 1 to reach the audience without the deterioration of the characteristic, whereby the image position is coincident with the sound position and hence a powerful image and sound effect can be obtained as well as the theater sound reproduction system. On the other hand, most of the projection light 9 projected onto the screen 1 is adequately reflected on the white screen surface 1a, but portions 9a and 9b of the projection light 9 penetrate the screen 1 to reach a wall 7 or the like which exists at the rear side of the screen 1. Although the penetration light 9a and 9b are reflected on the wall so as to again reach the screen surface 1b, the reflection light are shut by the weaved knit 1b so as not to be directed to the audience. Further, since the back surface of the white weaved knit 1a is not directly illuminated with the reflection light due to the black weaved knit 1b, the contrast can be improved as compared with the case that the screen 1 is constructed only with the white weaved knit 1a. Still further, since the white weaved knit is kept as it is, the screen gain is scarcely lowered and an excellent image quality can be obtained. As well as the above-described first and second embodiments, in the case that the air permeability of the cloth is set to be above 100, the acoustic permeability can be obtained as shown in FIG. 9 to provide the sound pressure frequency characteristic substantially similar to that of the case of only the loud speaker. Moreover, if the number of gages is arranged to be large and the fiber constituting the thread is arranged to substantially have a bar-like configuration, it is possible to provide a screen having a high acoustic permeability and the screen gain and further allowing a high image quality.

Furthermore, in addition to the effects of the above-described first and second embodiments, the third embodiment can provide the following effects. That is, if the weaved knit is surface-processed with a different material, the surface which is not processed slightly becomes darkened so as to slightly lower the light reflection performance. Since in the case of the third embodiment the surface process is not performed with respect to the projected surface (white weaved knit) 1a, the color of the projection surface of the screen can be kept to be substantially white, thereby keeping the light reflection performance to the value of the weaved knit itself.

Figure 14:
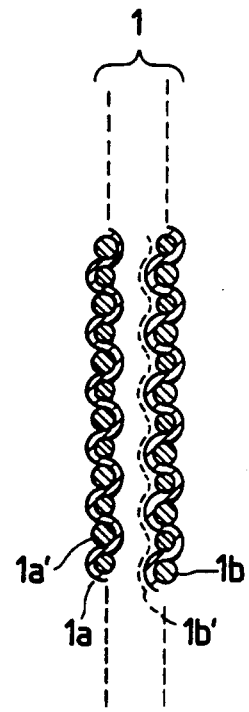
FIG. 14 is a perspective and cross-sectional view showing an arrangement of a screen according to a fourth embodiment of this invention.

A description will be made hereinbelow with reference to FIG. 14 in terms of a fourth embodiment of the present invention. In FIG. 14, designated at numeral 1 is a screen which comprises a weaved knit 1a formed by threads whose color is substantially white and a weaved knit where a dark-color metallic coat or the like is adhered on its surface by means of an adhesion technique. The weaved knits 1a and 1b are overlapped each other so that the metallic-coat adhered surface 1b' of the weaved knit 1b is at the inner side, in other words, both the weaved knits 1a and 1b are piled up on upon another so that the metallic-coat adhered surface 1b' is interposed therebetween as illustrated in FIG. 14. In the case that the cloth thus arranged is used as the screen 1 of the AV system as shown in FIG. 7, this screen 1 can offer the function and effect similar to that of the above-described third embodiment. In addition, this fourth embodiment can provide an advantage that both surfaces of the screen 1 can be used as the image projection surface (1a') under the condition that the weaved knit 1b substantially has white color as well as the weaved knit 1a.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A screen for projecting an optical image, comprising a weaved knit which has a predetermined air permeability and whose color is substantially white, a colored thin film being formed on one surface of said weaved knit and the other surface of said weaved knit being used as a surface onto which said image is projected.

2. A screen as claimed in claim 1, wherein said predetermined air permeability is set to be substantially above 100 cm$^3$/cm$^2$•sec.

3. A screen for projecting an optical image, comprising a weaved knit which has a predetermined air permeability and whose color is substantially white, a metallic thin film being formed on one surface of said weaved knit and the other surface of said weaved knit being used as a surface onto which said image is projected.

4. A screen as claimed in claim 3, wherein said predetermined air permeability is set to be substantially above 100 cm$^3$/cm$^2$•sec.

5. A screen for projecting an optical image, comprising a first weaved knit which has a first predetermined air permeability and whose color is substantially white and a second weaved knit which has a second predetermined air permeability and whose color is substantially black, one surface of said first weaved knits and one surface of said second weaved knit being overlapped one upon another so that the other surface of said first weaved knit is used as a surface onto which said image is projected.

6. A screen as claimed in claim 5, wherein said first and second predetermined air permeabilities are set to be substantially above 100 cm$^3$/cm$^2$•sec.

7. A screen for projecting an optical image, comprising first and second weaved knits which have first and second predetermined air permeabilities and whose colors are substantially white, a metallic coat which has a dark color being formed on one surface of said second weaved knit, and said first and second weaved knits being overlapped one upon another so that the metallic-coat-formed surface of said second weaved knit is disposed to be in opposed relation to one surface of said first weaved knit and the other surface of said first or second weaved knit is used as a surface onto which said image is projected.

8. A sreen as claimed in claim 7, wherein said first and second predetermined air permeabilities are set to be substantially above 100 cm$^3$/cm$^2$•sec.

* * * * *